Jan. 27, 1959 A. DA RIVA 2,871,303
TELEPHONE INTERCOMMUNICATION SYSTEM HAVING MEANS FOR INTERCONNECTING ANY TWO STATIONS
Filed Dec. 7, 1954
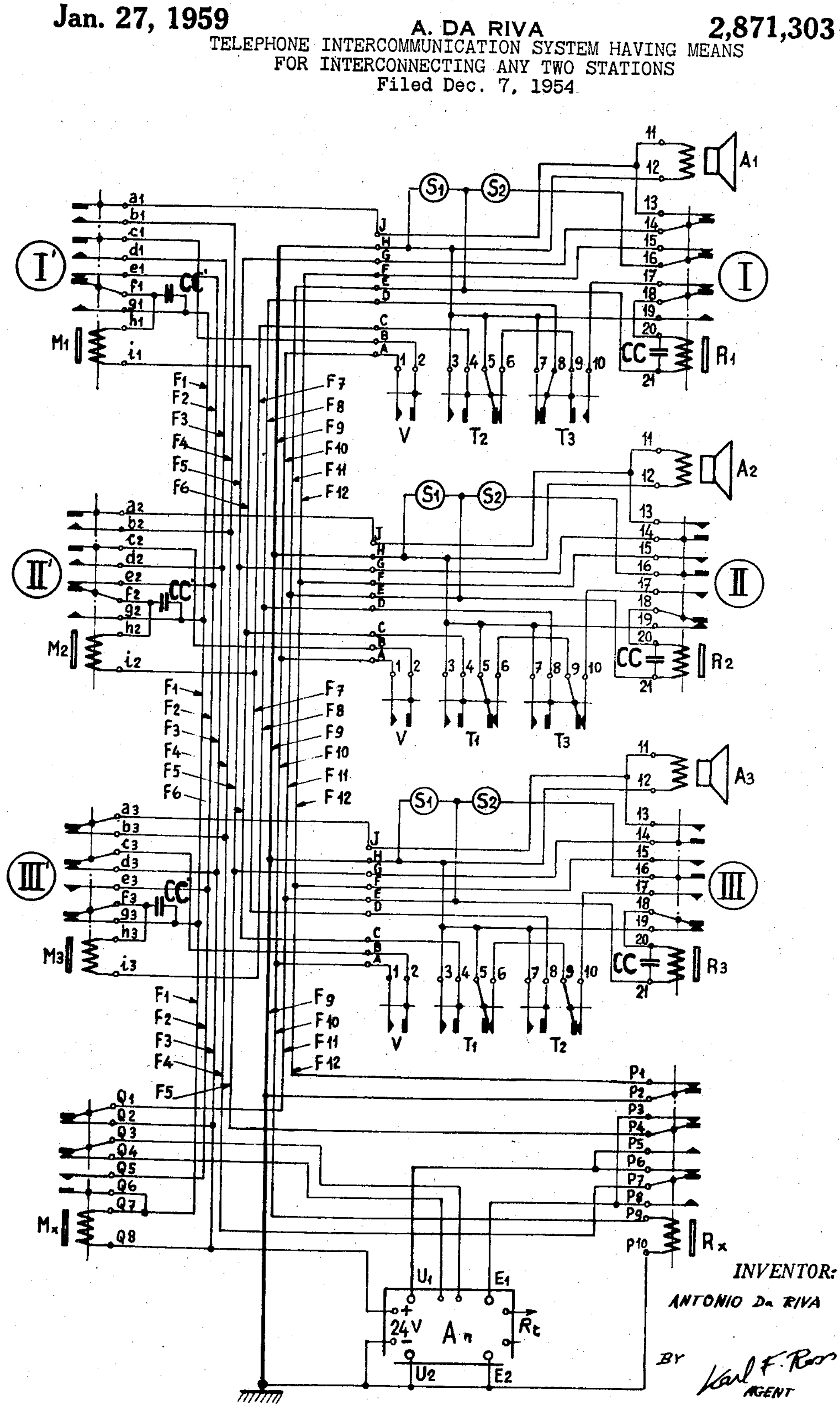
INVENTOR:
ANTONIO Da RIVA
BY Karl F. Ross
AGENT United States Patent Office 2,871,303

Patented Jan. 27, 1959

2,871,303

TELEPHONE INTERCOMMUNICATION SYSTEM HAVING MEANS FOR INTERCONNECTING ANY TWO STATIONS

Antonio Da Riva, Milan, Italy

Application December 7, 1954, Serial No. 473,588

Claims priority, application Italy April 6, 1954

12 Claims. (Cl. 179—39)

The present invention relates to a loud-speaking telecommunication system and more particularly to a system wherein communication is to be established between different rooms of an office, of a manufacturing plant, of a ship or the like.

Many solutions have been proposed or carried out in order to provide, by means of a series of magnetodynamic loudspeakers serving both as receivers and as transmitters, selective connections between the different posts or stations of a telephone communication system. These systems were not, however, free from drawbacks, among which there is to be mentioned that connections could be effected only between a main station and various secondary stations, whereas intercommunication between two secondary stations was not feasible. Furthermore, the earlier systems involved the provision, at each station, of interconnected line-selecting and line-lockout devices resulting in highly complex electrical circuit connections and an excessive number of wires, often of considerable length.

It is an object of the present invention to obviate these drawbacks, by providing a system which permits intercommunication between any desired two stations thereof.

Another object of the invention is the provision of means for avoiding any possibility that the communication, if once established between two stations of the system, may be disturbed by other stations thereof.

A further object of the invention is to concentrate at a central station, hereinafter referred to as the exchange, at least a part of the selecting and locking devices associated with each station, in order to reduce to the minimum the distances and the complexity of the connections between the individual devices.

Another object of the invention is the provision of a system wherein the number of stations is limited only by the physical capacity of each station to accommodate the necessary number of call levers or the like for each other station of the system.

A feature of this invention resides in the provision of a control relay individual to each station and a master relay at the exchange, each station having a series of selector elements such as buttons or keys, one for each of the other stations of the system with which it is adapted to communicate, which can be selectively actuated in the normal condition of the master relay to operate the control relay of a selected station and simultaneously to change the condition of the master relay, thereby preventing energization of any further control relay. Each station is also provided with an individual station relay which operates, under the control of the master relay, at every station other than the calling station, whereby the following conditions are established:

| Station | Control Relay | Station Relay |
|---|---|---|
| Calling | Unoperated | Unoperated. |
| Called | Operated | Operated. |
| All others (idle) | Unoperated | Do. |

Only the calling station and the called station, by virtue of their unique relay positions, are now able to communicate with each other by utilizing a common amplifier whose input and output terminals remain disconnected from the transmit-receive loudspeakers or electro-acoustic transducers of all idle stations. A "talk-listen" key or the like at the called station controls a relay at the exchange which adapts the system for speech transmission in one direction or the other, the condition of the talking circuits being preferably indicated at the calling station by the lighting or extinction of a signal lamp provided for this purpose. The off-normal (e. g. operated) condition of the master relay may be indicated at each station, according to another feature of the invention, by the energization of a "busy" lamp or similar signaling device.

The invention, as far as a preferred but not exclusive embodiment is concerned, will now be more particularly described with reference to the accompanying drawings, which is for illustrative purposes only and not limitative of the scope of the inventive concept, and whose sole figure shows an electrical diagram of a three-station system in which the circuits are arranged in the position corresponding to the calling of station III by station I.

Referring to the drawing, I, II, III are three stations of an intercommunication system, whilst I', II', III' are corresponding control circuits individual to said stations but preferably located at a common exchange. The latter is further provided with a reversing relay R*x*, a master relay M*x* and an amplifier A*m* connected to a source of electric power designated R*t*.

Each of the stations I, II, III is provided with a magnetodynamic loudspeaker A1, A2, A3, serving for voice transmission as well as for voice reception according to its connection with the input or the output voltage terminals of the amplifier A*m*. These stations are each further provided with a respective relay R1, R2, R3 which serves, in all stations except the calling one, to disconnect (as will be described further on) the input voltage terminals of said amplifier A*m* from the talking circuit of the respective loudspeaker. Each station is also provided with a selector set, symbolized by contacts T1, T2, T3, whose individual push buttons are assigned to the respective stations of the system. The selector set also comprises a "talk-listen" key V, which in the called station is to be depressed for talking and released for listening, as will be described hereinbelow.

Finally, each station is provided with an optical signaling means, in the form of a "busy" lamp S1, for signaling the establishment of a connection between any two stations, as well as with another optical signaling means, in the form of a "talk-listen" lamp S2, which when lit indicates at the calling station that the talking line is available for outgoing speech transmission.

Each of the control circuits I', II', III' at the exchange comprises a respective relay M1, M2, M3.

Following this general outline of the constitutive elements of the present system, the principal connections will now be described, it being understood that each station is connected to the remaining part of the system by means of circuits which are repeating themselves identically with respect to all other stations, similar reference characters being used throughout when referring to equivalent connections.

More particularly, each relay R1, R2, R3 comprises a magnet coil designated by its terminals 20—21, as well as the switching contacts 13—14 and 15—16 and the changeover contacts 17—18—19. The loudspeaker A1, A2, A3 of each station is connected between terminals 11, 12. Each selector set includes two of the push buttons T1, T2, T3, each provided with a pair of normally open contacts, designated 3—4 and 7—8 respectively, which are closed when the respective station is calling, and with a pair of normally closed contacts, designated 5—6 and 9—10 respectively, which are open when the station is calling (i. e. when the push button is operated). One terminal, 11, of the loudspeaker A1 is connected in parallel, through the lead J, to one element *a*1 of the contact pair *a*1—*b*1 of the relay M1 as well as to element 13 of the contact pair 13—14 of its own relay R1, and the terminal 12 is connected through the lead H to the lead F9, which forms the grounded negative bus bar of the system. The terminal 14 is in turn connected, through lead G, to the lead F5 which is multipled to the analogous leads G of all other stations and which is connected to the intermediate element or armature P4 of the change-over switch P4—P3—P5 of the first auxiliary relay R*x*. The contact element 15 of pair 15—16 is connected, through lead F, to lead F12 which extends to the contact element P1 of pair P1—P2 of the reversing relay R*x*, the other element P2 of this pair being connected to the negative bus bar F9, while the other element 16 of the pair 15—16 is connected to the lamp S2 and thence, via this lamp and the leads E and F11, to the element Q1 of contact pair Q1—Q2 of the master relay M*x*, the circuit continuing from contact element Q2 to the positive pole +24 v. of the amplifier A*m*.

The element 17 of changeover contacts 17—18—19 is connected to element 10 of the contact pair 9—10 of the push button T3 (stations I and II) or T2 (station III); its element 18 is connected to terminal 19 of the magnet coil of the relay R1, R2 or R3, and its element 19 is connected to the negative bus bar F9 through lead H. The magnet coil is connected over its other terminal 21 to the lead E, which is connected over lead F11 to element Q1 of contact pair Q1—Q2 of the second auxiliary relay M*x*. The element 7 of contact pair 7—8 of the push button T3 (or T2) is connected over lead H, as shown, to the negative bus bar F9 and its other element 8 is connected over lead D and lead F8 (or F7) to terminal 13 (or 12) of the winding of the corresponding relay M3 (or M2) of the station with which this button is associated. Element 5 of contact pair 5—6 of the push button T2 (station I) or T1 (stations II and III) is connected to the negative bus bar F9, its other element 6 being connected to the contact 9. In the same way the element 3 of contact pair 3—4 of the push button T2 (or T1) is connected to the negative bus bar F9 and its other element 4 is connected over lead C to lead F7 (or F6), which is connected to terminal *i*2 (or *i*1) of the winding of relay M2 (or M1) of the other station with which said button is associated.

Considering now the reversing relay R*x* of the system, it will be seen that it is energized by the closure of the contacts 1—2 of the key V of a called station, e. g. station III, provided that also the corresponding one of the relays M1, M2 or M3 is operated by actuation of the proper push button (T3) at a calling station e. g. station I, over its normally closed contacts *e*3—*f*3, closed contacts Q5—Q6 of relay M*x* and the windding of the latter relay. In this condition the magnet coil P9—P10 is connected over lead F10 to the contacts 1—2 and over the latter to the closed contacts *c*3—*d*3, and thence to the positive pole +24 v. The operation of relay R*x* causes the contacts P4—P3 to open, whereby the calling loudspeaker A1 is disconnected (at lead F5) from the input voltage terminal E1 of the amplifier, whereas, owing to the closing of the contacts of relay R*x* and to the closure of the contacts *a*3—*b*3 by the assumed operation of relay M3, the loudspeaker A3 of the called station is connected over line F4 and lead J to the input terminal E1 of the amplifier. The excitation of the relay R*x* also causes the contacts P1—P2 to open and thus, since the circuit grounding leads F12 and F are thereby interrupted, lamp S2 at calling station I is extinguished. It is manifest that if key V at the answering station III is now released, the relay R*x* is no longer energized, whereby terminal 12 of loudspeaker A1 is switched from output terminal V1 of amplifier A*m* to its input terminal E1, the corresponding terminal of loudspeaker A3 is inversely switched from amplifier input terminal E1 to output terminal U1, and the lamp S2 at station I is re-lit.

Considering now the master relay M*x*, it will be noted that the same operated in series with relay M3 and opened the latter's energizing circuit at Q5—Q6, but not before relay M3 had locked over contacts *f*3—*g*3. After contacts Q3—X3 break, relay M3 remains energized for a sufficiently long period by the discharge of a condenser CC′, effectively connected in shunt with it, through its winding. Relay M*x* in operating closes the contacts Q1—Q2 and thus energizes the relays R2, R3 (i. e. the relays of all stations except the calling one), closes the contacts Q3—Q4 and thus supplies the amplifier A*m* with anode current, and by opening the contacts Q5—Q6 disconnects positive voltage from lead F2 and prevents the excitation of relays M1, M2 and similar relays (not shown) associated with other stations of the system, the relay M3 being locked to potential through the winding of relay M*x* and remaining energized over lead F8 under the control of push button T3 which is depressed at the station I.

From the ensuing description of the mode of operation of the system, assuming station III being called by station I, the various connections between the relays, the loudspeakers, the amplifier and the lamps of the system will appear more clearly. When station I calls station III, the corresponding push button T3 of station I is operated, so that the following conditions obtain: The contacts 9—10 are opened. The contacts 7—8 are closed. Thus a circuit is established as follows: Ground—F9—H—station I—7—8—D—F8—13—*h*3—*f*3—*e*3—F2—Q5—Q6—Q7—Q8—(+24 v.), exciting therefore in series the relays M3 and M*x*, so that the contact *f*3 connects with contact *g*3 and is connected over the latter and the circuit elements F1—Q7—Q8 to the positive pole (+24 v.), as shown in the drawing, whereby the relay M3 remains excited. The relays M3 and M*x* attract their respective armatures, whereby the connections are altered as follows: The contacts Q3—24 are closed, supplying anode current to the amplifier A*m*. The contacts Q1—Q2 are closed, exciting the relays R2 and R3 over the circuit (+24 v.)—Q2—Q1—F11—E—21—20—18—17—10—9—6—5—H—F9—ground. Relays R2 and R3 lock to ground on lead H over contacts 18—19 after contacts 17—18 break, the relays R2, R3 remaining energized during the change-over by the discharge of respective shunt condensers CC through their windings. All lamps S1 are simultaneously lit.

The operation of relay R2 at station II, which is representative of any number of stations, not further illustrated, that are idle during a call between stations I and II, opens the contacts 13—14 and disconnects the input terminals E1 of the amplifier A*m* from talking circuit 11, 12 of the respective loudspeaker; at the same time the contacts 15—16 open and break the circuit of the respective lamp S2. The same occurs at the called station III, but there an alternative circuit for loudspeaker A3 is closed at the contacts *a*3, *b*3 of operated control relay M3.

At the calling station I, the relay R1 is not excited since the contacts 9—10 were opened before closure of contacts 7—8, upon actuation of push button T3, and interrupted the continuity of the energization circuit of the relay R1; therefore the loudspeaker A1 is connected across the input voltage terminals E1, E2 of the amplifier over the circuit E1—P3—P4—F5—G—14—13—11—12—H—F9—ground—E2. The lamp S2 at station I, when lit over a circuit including closed contacts P1—P2 of unoperated relay R*x*, indicates that the talking line is available for speech transmission from the calling to the called station.

At the exchange the relay M3 is excited, and the talking circuit over its contacts $a3$—$b3$, connecting the loudspeaker A3 across the output voltage terminals of the amplifier, can be traced as follows: U1—P6—P7—F4—$b3$—$a3$—J—11—12—H—F9—ground—U2.

A person at station III is in a position to answer the call of the station I by operating the push button V which over the circuit (+24 v.)—F3—$d3$—$c3$—2—1—A—F10—P9—P10—ground energizes the relay R$x$; this relay, in turn, reverses the talking circuits by connecting the magnetodynamic loudspeaker A3 as a transmitter to the input voltage terminals of the amplifier A$m$ while connecting the magnetodynamic loudspeaker A1 as a receiver to the output voltage terminals of the same amplifier.

Upon each reversal the contacts P1—P2 are also opened, thereby interrupting the circuit of the lamp S2 which had been lit at the station I. This extinction of the lamp informs the caller at station I that the talking line has been changed over from speaking to listening condition.

Protection against the possibility of interference from the idle stations is obtained by virtue of the fact that the input voltage terminals E1—E2 of the amplifier are cut off, at the open contacts 13—14 of the corresponding station relays (e. g. R2), from the talking circuit of each respective loudspeaker; similar protection against listening-in is provided because of the fact that the output voltage terminals U1—U2 of the amplifier are disconnected from the loudspeaker of each idle station by the opening of the contacts $a2$—$b2$ of the respective control relays (e. g. M2). Moreover, the key V of a quiescent station such as II, even if operated, is not in a position to disturb the communication between the stations I and III, since all the associated circuits are interrupted at the open contacts $c2$—$d2$ of the corresponding control relay such as M2. Such control relay cannot be energized at this time because of the opening of the contacts Q6—Q5 of the relay M$x$.

What is claimed is:

1. In a telephone communication system having at least three stations adapted for selective communication with one another, in combination, amplifier means common to all of said stations, a first group of relays each individual to a respective one of said stations, a second group of relays each individual to a respective one of said stations, a master relay common to all of said stations, each of said stations being provided with a set of manually operable selector elements individually assigned to respective ones of the remaining stations, each relay of said first group having an energizing circuit connected to corresponding selector elements of all of said stations, other than its own station, for operation upon actuation of any such selector element, means controlled by said master relay for preventing the operation of any relay of said first group in an off-normal position of said master relay, circuit means so linking said master relay with each relay of said first group as to change said master relay from a normal position to said off-normal position upon the operation of the relay of said first group at a called station in response to actuation of the corresponding selector element at a calling station, thereby preventing the operation of a relay of said first group at any station other than said called station, each relay of said second group having an energizing circuit normally connected to be closed by said master relay in said off-normal position thereof, switch means controlled by an actuated selector element at said calling station for preventing the operation of the relay of said second group at said calling station, whereby the relays of said first and second groups at all of said stations other than said calling and called stations are unoperated and operated, respectively, electro-acoustic transducer means at each of said stations, and contact means controlled by the relays of said first and second groups for operatively connecting said transducer means of only said calling and called stations to said amplifier means.

2. The combination according to claim 1, wherein said amplifier means is located at an exchange common to all of said stations, said master relay and all the relays of said first group being likewise located at said exchange.

3. The combination according to claim 1, wherein each of said transducer means comprises a transmit-receive loudspeaker, each of said stations being provided with talk-listen key means, said amplifier means having input and output terminals, said system further including talking conductors extending from said input and output terminals to said loudspeaker at said calling and at said called station by way of said contact means controlled by the first-group and second-group relays thereof, a reversing relay controllable by said called station for reversing the connections of said talking conductors to said input and output terminals, thereby enabling selective speech transmission from said called to said calling station or vice versa, and contact means controlled by said unoperated relays of said first group for inactivating said key means at all of said stations other than said called stations.

4. The combination according to claim 3, wherein said reversing relay, said master relay, said amplifier means and all the relays of said first group are located at an exchange common to all of said stations.

5. The combination according to claim 4, wherein said talking conductors include a grounded bus bar extending from said exchange to all of said stations.

6. The combination according to claim 5, wherein each of said loudspeakers is provided with a first terminal permanently connected to said bus bar and with a second terminal connected in parallel to normally open contacts of the respective relay of said first group and to normally closed contacts of the respective relay of said second group.

7. The combination according to claim 3, further comprising visual signaling means at each of said stations for indicating the direction of speech transmission over said talking conductors, conductor means extending from all of said signaling means toward said reversing relay, contacts connected to said conductor means and controlled by said reversing relay for closing an energizing circuit for said signaling means in one condition of operation of said reversing relay, and contacts controlled by said operated relays of said second group for inactivating said signaling means at all of said stations other than said calling station.

8. The combination according to claim 1, further including visual signaling means at each of said stations for indicating the existence of a talking connection between any two of said stations, conductor means extending from all of said signaling means toward said master relay, and contacts connected to said conductor means and controlled by said master relay for energizing all of said signaling means in said off-normal position of said master relay.

9. The combination according to claim 1, wherein each of the relays of said first group is provided with an energizing circuit including a reversing armature of its own in series with a winding of said master relay, said master relay being provided with a pair of normally open contacts, said armature when normal extending said energizing circuit over said normally open contacts, said armature when attracted completing a holding circuit for both said master relay and the respective first-group relay independent of said normally open contacts.

10. The combination according to claim 9, including condenser means connected to said armature for maintaining the respective first-group relay operated during reversal of said armature from normal to attracted position.

11. The combination according to claim 1, wherein each of the relays of said second group is provided with an energizing circuit including a reversing armature of its own in series with normally closed contacts of all of said selector elements of the respective station, said armature when attracted completing a holding circuit for the respective second-group relay independent of said normally closed contacts.

12. The combination according to claim 11, including condenser means connected to said armature for maintaining the respective second-group relay operated during reversal of said armature from normal to attracted position.

References Cited in the file of this patent

UNITED STATES PATENTS

| | | |
|---|---|---|
| 2,181,715 | Waite | Nov. 28, 1939 |
| 2,245,756 | Cavanaugh et al. | June 7, 1941 |
| 2,377,562 | Lomax | June 5, 1945 |
| 2,565,192 | Adler | Aug. 21, 1951 |